United States Patent
Iwashita et al.

(10) Patent No.: US 7,392,684 B2
(45) Date of Patent: Jul. 1, 2008

(54) CONTROL SYSTEM FOR SERVO DIE CUSHION

(75) Inventors: Yasusuke Iwashita, Yamanashi (JP); Tadashi Okita, Yamanashi (JP); Hiroyuki Kawamura, Yamanashi (JP); Satoshi Ikai, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 11/456,507

(22) Filed: Jul. 10, 2006

(65) Prior Publication Data

US 2007/0006630 A1 Jan. 11, 2007

(30) Foreign Application Priority Data

Jul. 11, 2005 (JP) ............................. 2005-201225

(51) Int. Cl.
*B21J 9/18* (2006.01)
(52) U.S. Cl. ............................. 72/454; 72/443; 72/21.4
(58) Field of Classification Search .................. 72/20.1, 72/21.1, 21.4, 31.11, 350, 351, 441, 443, 72/454, 20.2, 20.3, 20.4; 100/273
See application file for complete search history.

(56) References Cited

U.S. PATENT DOCUMENTS 5,435,166 A * 7/1995 Sunada ........................ 72/351

FOREIGN PATENT DOCUMENTS

JP 10202327 A1 8/1998

* cited by examiner

*Primary Examiner*—Derris H. Banks
*Assistant Examiner*—Debra M Wolfe
(74) *Attorney, Agent, or Firm*—Lowe, Hauptman, Ham & Berner, LLP

(57) ABSTRACT

A control system, for a press machine including a plurality of die cushions, by which force control and position control may be suitably switched from one to another in each control device for each of the die cushions. The control system includes a plurality of control devices for controlling a servomotor of each die cushion and a switching signal generating part capable of collecting the judgment result of each control device. The switching signal generating part transmits a switching signal to each control device, in order to switch the control mode of each control device.

8 Claims, 3 Drawing Sheets

CONTROL SYSTEM FOR SERVO DIE CUSHION

RELATED APPLICATIONS

The present application is based on, and claims priority from, Japanese Application Number 2005-201225, filed Jul. 11, 2005, the disclosure of which is hereby incorporated by reference herein in its entirety.

BACKGROUND OF THE INVENTION

1. Field of the Invention

The present invention relates to a control system, for a servo die cushion, which generates a force on a slide of a press machine using a servomotor as a drive source.

2. Description of the Related Art

It is known that a press machine, for press working such as bending, drawing or punching, can be provided with a die cushion mechanism, as an attached device, for applying a predetermined force or pressure, during the press working, to a movable support member (generally called a slide) supporting a first mold for press working, the force being generated by another movable member supporting a second mold. The die cushion mechanism is generally configured such that the slide (or the first mold), moving in a mold-clamping direction, directly or indirectly collides with a movable element (generally called as a cushion pad) held at a predetermined pressure and, until the molding is finished, the cushion pad is moved with the slide while applying force or pressure to the slide. During this operation, it is possible to prevent the occurrence of wrinkles in a workpiece to be pressed by, for example, clamping an area around a site, of the workpiece to be pressed, between the cushion pad and the slide.

Many conventional die cushion mechanisms use a hydraulic or a pneumatic unit as a drive source. However, control by a hydraulic or a pneumatic unit may be carried out only under a constant pressure. It is preferable that the pressure during drawing is varied corresponding to the amount of the drawing. However, the pressure cannot be varied in a hydraulic or a pneumatic unit.

In recent years, therefore, a die cushion mechanism using a servomotor as a drive source has been used to carry out force control at a high speed, as described in Japanese Unexamined Patent Publication (Kokai) No. 10-202327. In the die cushion mechanism described in this publication, a cushion pad positioned below a slide of a press machine may be upwardly and downwardly moved by a servomotor, corresponding to the rise and fall motions of the slide. The servomotor is activated by a predetermined force command corresponding to the position of the cushion pad and adjusts the force or pressure applied, to the slide, by the cushion pad while the cushion pad moves with the slide. The collision of, and pressure between, the slide and the cushion pad may be determined by detecting a load applied to the output of the servomotor via the cushion pad.

It could be said that one preferred control device for the die cushion is capable of suitably switching from the above force control to position control by using a position detector, or vice versa. For example, a control device as shown in FIG. 3 has a first speed commanding part 56, for generating a first speed command of the die cushion, based on a position command generated by a position commanding part 52 and a detected result by a position detector 54 for detecting the position of the die cushion. The control device 50 also has a second speed commanding part 62, for generating a second speed command of the die cushion, based on a force command generated by a force commanding part 58 and a detected result by a force detector 60 for detecting the pressure between the slide and the die cushion. The control device 50 further has a switch judging part 64 for judging that the command for controlling the die cushion should be switched from the first command to the second command, or vice versa, and a switching part 66 for switching the command based on the judgment of the judging part 64.

If the number of the die cushion to be controlled is one, the control device 50 may perform a control of the die cushion more preferable than only force control or speed control. However, when the cushion pad is relatively large and the cushion pad is supported by a plurality of die cushions, the control device 50 cannot perform suitable control. In other words, when a plurality of die cushions are used, each die cushion is independently controlled by an individual control device. Therefore, at a certain of time during press machining, there may be a situation in which one die cushion is controlled by position control and the other die cushion is controlled by force control. In such a situation, as the cushion pad supported by the plurality of die cushions is generally an integral member, an undesired mechanical distortion may occur in the cushion pad due to an excess force applied to the cushion pad. As a result, the accuracy of press machining may be reduced and the press machine may be damaged.

SUMMARY OF THE INVENTION

Therefore, an object of the present invention is to provide a control system, for a press machine including a plurality of die cushions, by which force control and position control may be suitably switched from one to another in each control device for each of the die cushions. According to the present invention, there is provided a control system including a plurality of control devices for a servo die cushion mechanism including a plurality of die cushions, for generating a force applied to a slide by using a servomotor as a drive source, the control system comprising: a position commanding part for generating a position command of each die cushion; a position detecting part for detecting the position of each die cushion; a force commanding part for generating a force command between the slide and each die cushion; and a force detecting part for detecting a force generated between the slide and each die cushion, wherein each control device comprises: a first speed commanding part for generating a first speed command of each die cushion based on the position command and the position detected by the position detecting part; a second speed commanding part for generating a second speed command of each die cushion based on the force command and the force detected by the force detecting part; a switch judging part for judging that the command for controlling each die cushion should be switched from the first command to the second command, or vice versa; and a switching part for switching the command based on the judgment of the switch judging part, and wherein the control system further comprises: a switching signal generating part capable of collecting the judgment result of each switch judging part, the switching signal generating part being configured to generate a switching signal and transmit the signal to the switching parts of the plurality of control devices, either when the number of control devices, in which the switch judging parts judge the command for controlling the die cushions should be switched from the first speed command to the second speed command, reaches a first predetermined number, or when the number of control devices, in which the switch judging parts judge the command for controlling the die cushions should be switched from the second speed command to the first speed command, reaches a second predetermined number.

Concretely, the first and second predetermined numbers may be equal to one.

Alternatively, the first and second predetermined numbers may be equal to two.

Alternatively, the first and second predetermined numbers may be equal to half of the number of the control devices.

Alternatively, the first and second predetermined numbers may be equal to the number of the control devices.

Alternatively the first predetermined number may be equal to one and the second predetermined number may be equal to the number of the control devices.

Alternatively, the first predetermined number may be equal to two and the second predetermined number may be equal to the number of the control devices.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

The present invention is explained below with reference to the drawings.

Figure 1:
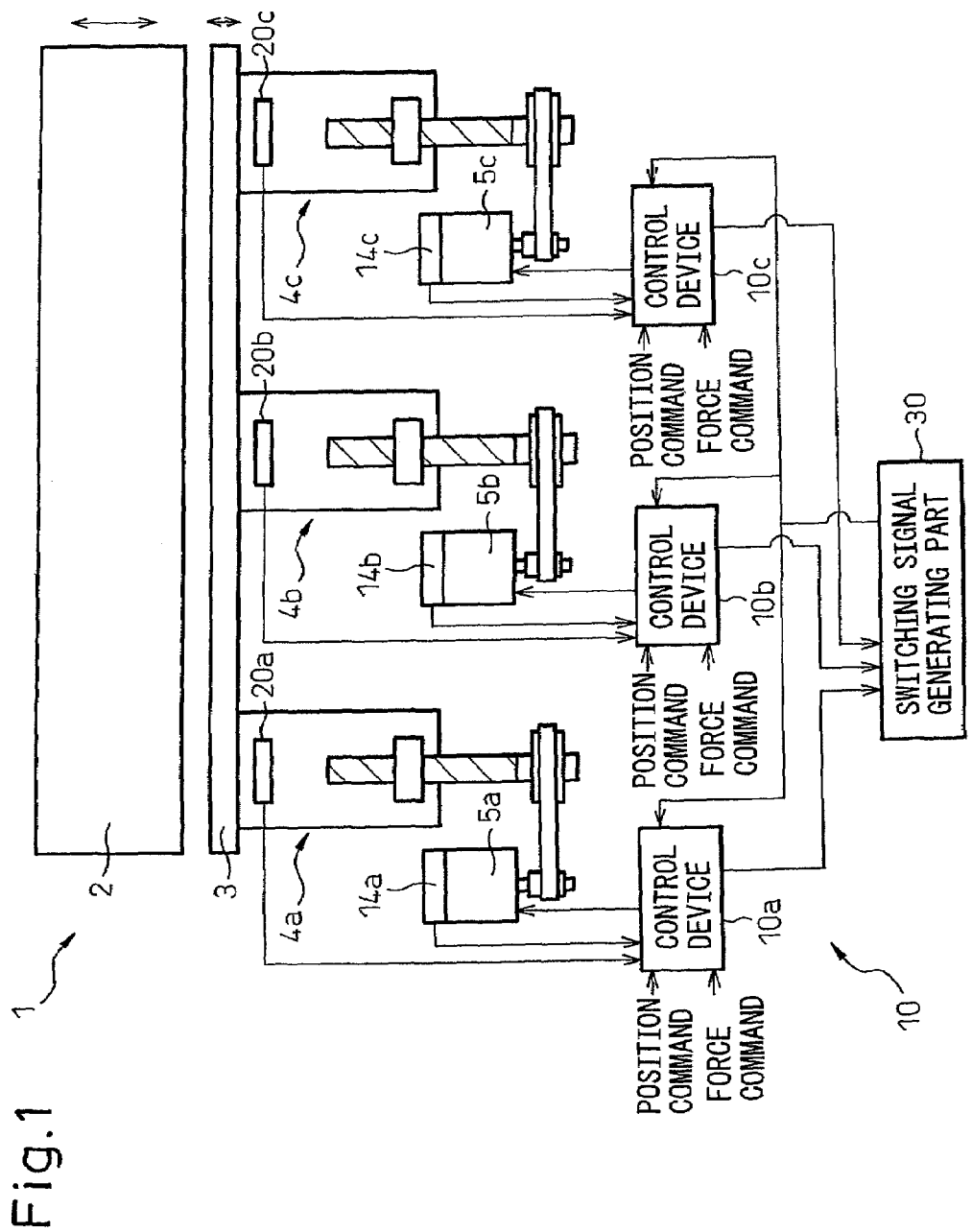
FIG. 1 shows a schematic configuration of a press machine including a control system for a servo die cushion according to the present invention.

FIG. 1 shows a schematic configuration of a press machine 1 including a control system 10 for a servo die cushion according to the present invention. The press machine 1 has a slide 2 driven by a suitable link mechanism (not shown), a cushion pad 3 capable of moving corresponding to the motion of the slide 2 and a plurality of (three in this case) die cushion mechanisms 4a, 4b and 4c for cooperatively driving the cushion pad 3. The positions the die cushions are respectively changed by servomotors 5a, 5b and 5c controlled by control devices 10a, 10b and 10c. In other words, each control device controls the speed of each die cushion. The control system 10 has a switching signal generating part 30 configured to receive the judgment result of each control device, to generate a switching signal and to transmit the signal to the control devices for switching the control mode of the die cushions. The number of the die cushions of the control devices may be equal to or larger than two. In relation to the application of the invention, there is no difference depending on the number of the die cushions or the control devices.

Figure 2:
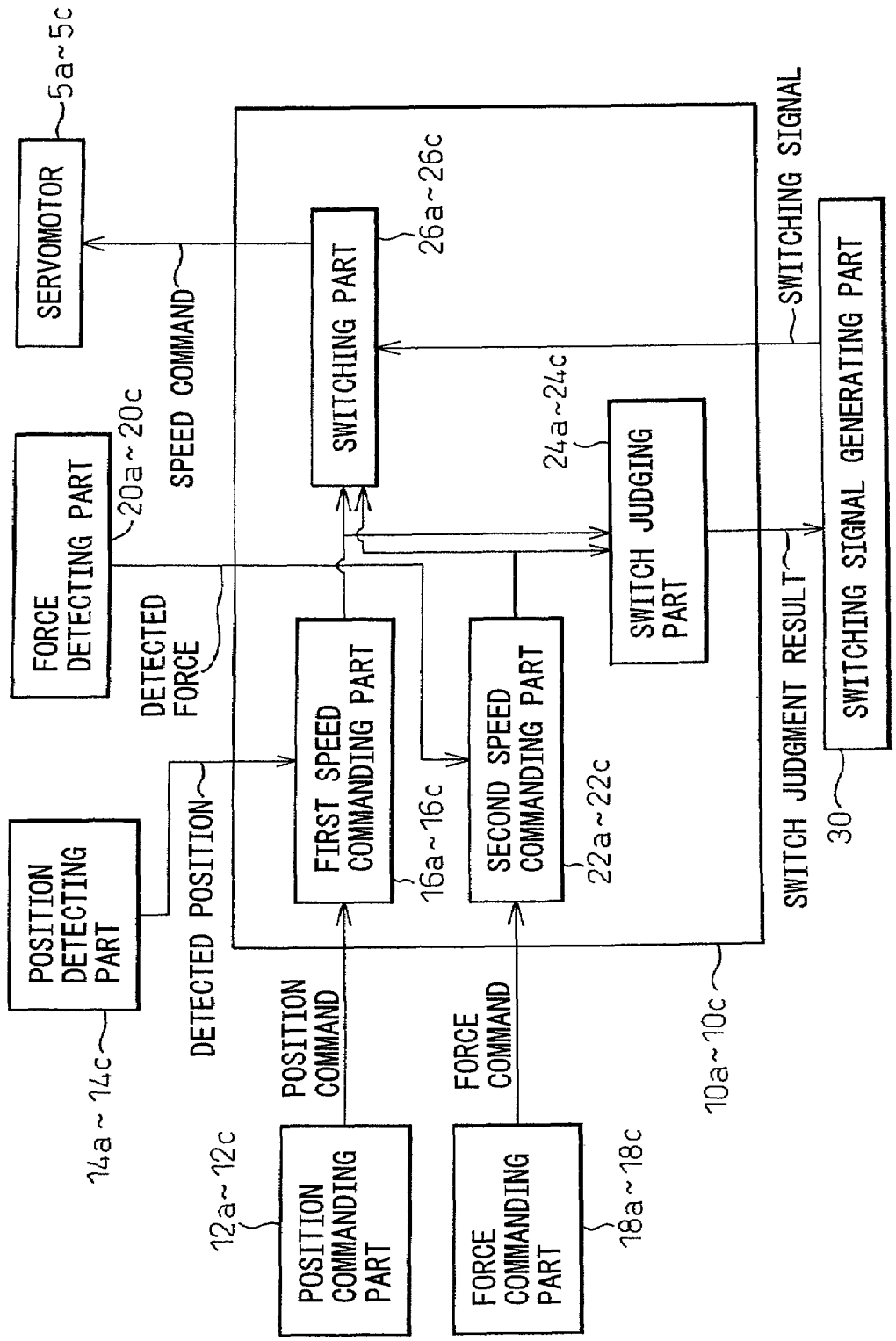
FIG. 2 shows the detailed constitution of each control device shown in FIG. 1.
Figure 3:
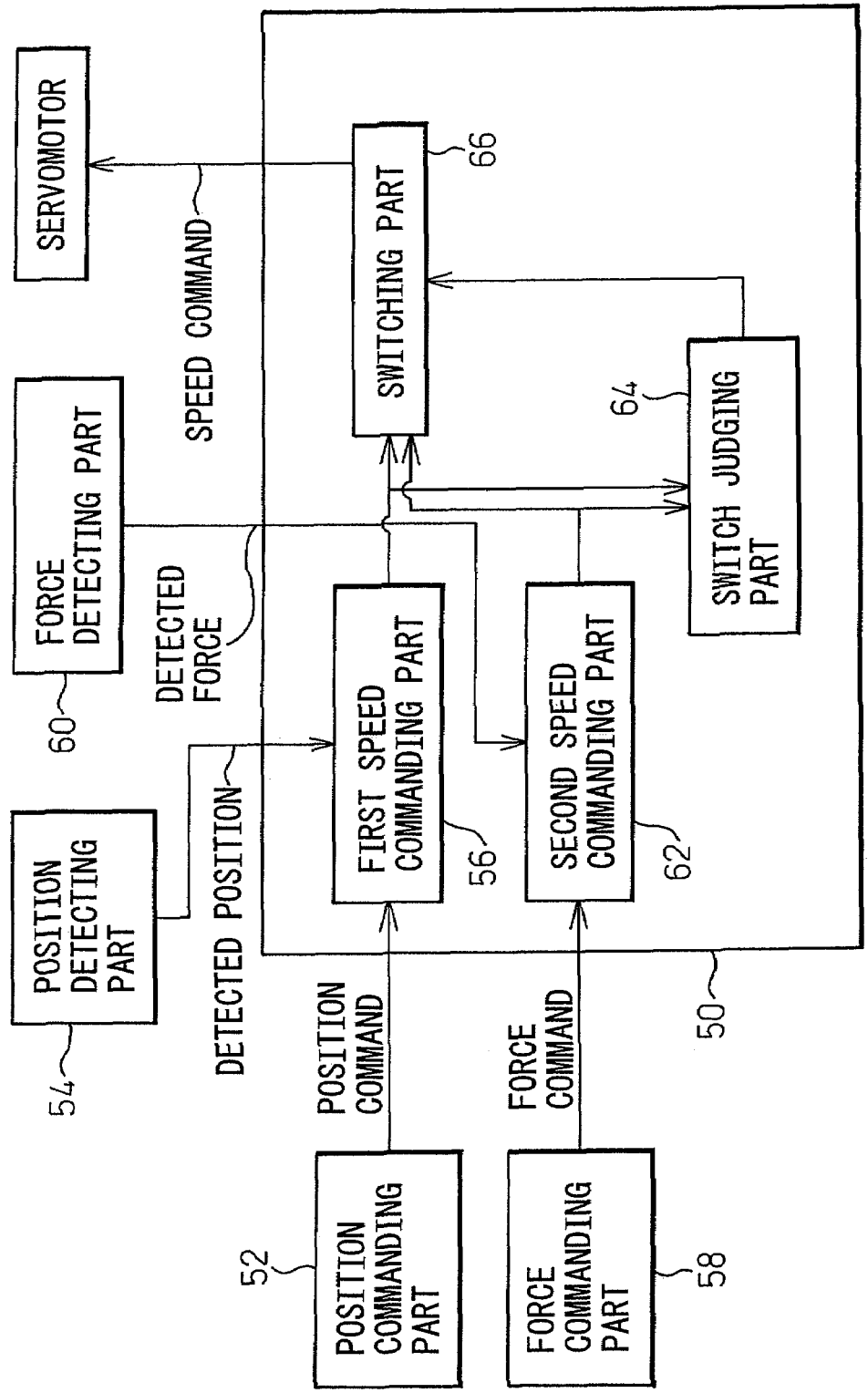
FIG. 3 shows an example of the constitution of a control device for individually controlling each die cushion.

FIG. 2 shows the detailed constitution of each control device. Only the control device 10a is described in detail below, as the other control devices 10b and 10c may be the same as the control device 10a. The control device 10a has a first speed commanding part 16a for generating a first speed command for the die cushion 4a, based on a position command generated by a position commanding part 12a of the die cushion 4a and detected data generated by a position detecting part 14a for detecting the position of the die cushion 4a. Due to this, the control device 10a may generate a speed command for the servomotor 5a based on the position control. Also, the control device 10a has a second speed commanding part 22a for generating a second speed command for the die cushion 4a, based on a force command generated by a force commanding part 18a of the die cushion 4a and a detected data by a force detecting part 20a for detecting the force between the die cushion 4a and the slide 2. Due to this, the control device 10a may also generate a speed command for the servomotor 5a based on the force control.

Further, the control device 10a has a switch judging part 24a for judging that the command for controlling the die cushion 4a should be switched from the first speed command to the second speed command, or vice versa. At this point, it is preferable that one of the speed commands is selected such that the press force or the force between the slide 2 and the cushion pad 3 does not excessively increase. For example, by comparing the position control with the force control, one of the control modes, in which the die cushion 4a is downwardly moved longer (i.e., farther away from the slide 2), may be selected for controlling the die cushion. The control device 10a also has a switching part 26a for switching the first speed command to the second speed command, or vice versa, upon receiving a switching signal from a switching signal generating part 30.

As shown, the control system 10 of the invention includes a switching signal generating part 30 capable of collecting the judgment results of switch judging parts of the control devices 10a, 10b and 10c. The major feature of the control system 10 is that each control device 10a, 10b or 10c does not change the control mode of the die cushion upon each judgment result of each switch judging part of each control device is outputted, instead, each judgment result is first transmitted to the switching signal generating part 30 in a suitable form such as a signal and, then, the switching signal generating part 30 generates a switching signal based on the judgment results the switch judging parts and a predetermined criterion. Subsequently, each switching part of each control device switches the control mode of the die cushion from the position control to the force control, or vice versa, upon receiving the switching signal from the switching signal generating part 30. For example, the predetermined criterion is either when the number of control devices, in which the switch judging parts judge the command for controlling the die cushions should be switched from the first speed command to the second speed command (i.e., from the position control to the force control), reaches a first predetermined number, or when the number of control devices, in which the switch judging parts judge the command for controlling the die cushions should be switched from the second speed command to the first speed command (i.e., from the force control to the position control), reaches a second predetermined number. At this point, it is preferable that transmission of the switching signal to each control device and switching action of the control mode of each die cushion are simultaneously performed in all control devices.

The above first and second predetermined numbers may be set to various suitable values. For example, preferable values for the first and second numbers are one, two, half the number of the control devices, and the number of the control devices (or the number of the die cushions). When the first and second predetermined numbers are equal to one, the fastest switching action can be performed. This is because control modes of all die cushions are simultaneously switched when only one control device judges that the control mode of corresponding die cushion should be changed. When the first and second predetermined numbers are equal to two, in addition to the similar effect to the case in which the first and second numbers are equal to one, a risk or a disadvantage, in case that the first judgment is due to a malfunction or a false detection, may be avoided. This is because it is highly unlikely that a malfunction or a false detection occurs twice in a row.

If the number of the control devices is very high and switching action of the control mode should be somewhat delayed, the predetermined numbers may be equal to a half of the number of the control devices. When the number of control devices is an odd number N, the "half" may be equal to either (N+1)/2 or (N−1)/2. Also, a number near a half of the number of control devices may be used.

When the first and second predetermined numbers are set to the number of the control devices, switching action is not performed until all switch judging parts of the control devices judge that the control mode of each die cushion should be changed. Therefore, this method is suitable when switching of the control mode is desired to be delayed as much as possible.

In any predetermined number, all control devices may simultaneously switch the control mode of corresponding die cushion at a certain point in time. Therefore, unlike a case in which each die cushion is independently controlled, the position control and the force control are not performed at the same time. Due to this, a disadvantage, such as an undesired mechanical distortion in the cushion pad, which may be generated by an excess force applied to the cushion pad, is avoided.

The first and second predetermined numbers may be different from each other. For example, the first number, used for switching the position control to the force control, may be set to one or two and, further, the second number, used for switching the force control to the position control, may be set to the number of the control devices. In this case, switching action from the position control to the force control is quickly performed but, on the other hand, switching action from the force control to the position control is delayed as much as possible. Therefore, a period of time during the force control, which is more suitable than the position control in respect of avoiding an excess increase of the press force, may be extended.

According to the control system for the servo die cushion of the present invention, in controlling a plurality of die cushions by using a plurality of control devices, all control devices switch the control mode of the die cushions when switch judging parts of a predetermined number of control devices judge that the control mode of corresponding die cushion should be switched from position control to force control, or vice versa. Therefore, the position control and the force control are not performed at the same time, whereby an excess force is prevented from being applied to the cushion pad.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control system, comprising:
    a plurality of control devices for respectively controlling a plurality of die cushions driven by servomotors to apply forces to a slide;
    a position commanding part for generating a position command for controlling a position of each die cushion;
    a position detecting part for detecting the position of each die cushion;
    a force commanding part for generating a force command for controlling a force between the slide and each die cushion; and
    a force detecting part for detecting the force between the slide and each die cushion:
    wherein each control device comprises:
        a first speed commanding part for generating a first speed command for each die cushion based on the position command and the position detected by the position detecting part;
        a second speed commanding part for generating a second speed command for each die cushion based on the force command and the force detected by the force detecting part;
        a switch judging part for judging whether a speed command for controlling each die cushion should be switched from the first speed command to the second speed command, or vice versa; and
        a switching part for switching the speed command based on a judgment result of the switch judging part; and
    wherein the control system further comprises:
        a switching signal generating part for collecting the judgment result of each switch judging part, the switching signal generating part being configured to generate a switching signal and transmit the switching signal to the switching parts of the control devices, either when the number of control devices, in which the switch judging parts judge that the speed commands for controlling the respective die cushions should be switched from the first speed command to the second speed command, reaches a first predetermined number, or when the number of control devices, in which the switch judging parts judge that the speed commands for controlling the respective die cushions should be switched from the second speed command to the first speed command, reaches a second predetermined number.

2. The control system as set forth in claim 1, wherein the first and second predetermined numbers are equal to one.

3. The control system as set forth in claim 1, wherein the first and second predetermined numbers are equal to two.

4. The control system as set forth in claim 1, wherein the first and second predetermined numbers are equal to approximately half of a total number of the control devices.

5. The control system as set forth in claim 1, wherein the first and second predetermined numbers are equal to a total number of the control devices.

6. The control system as set forth in claim 1, wherein the first predetermined number is equal to one and the second predetermined number is equal to a total number of the control devices.

7. The control system as set forth in claim 1, wherein the first predetermined number is equal to two and the second predetermined number is equal to a total number of the control devices.

8. The control system as set forth in claim 1, wherein the switching parts of all the control devices are configured to simultaneously switch the speed commands for controlling the respective die cushions upon receipt of the switching signal from the switching signal generating part.

* * * * *